United States Patent Office 3,047,117
Patented July 31, 1962

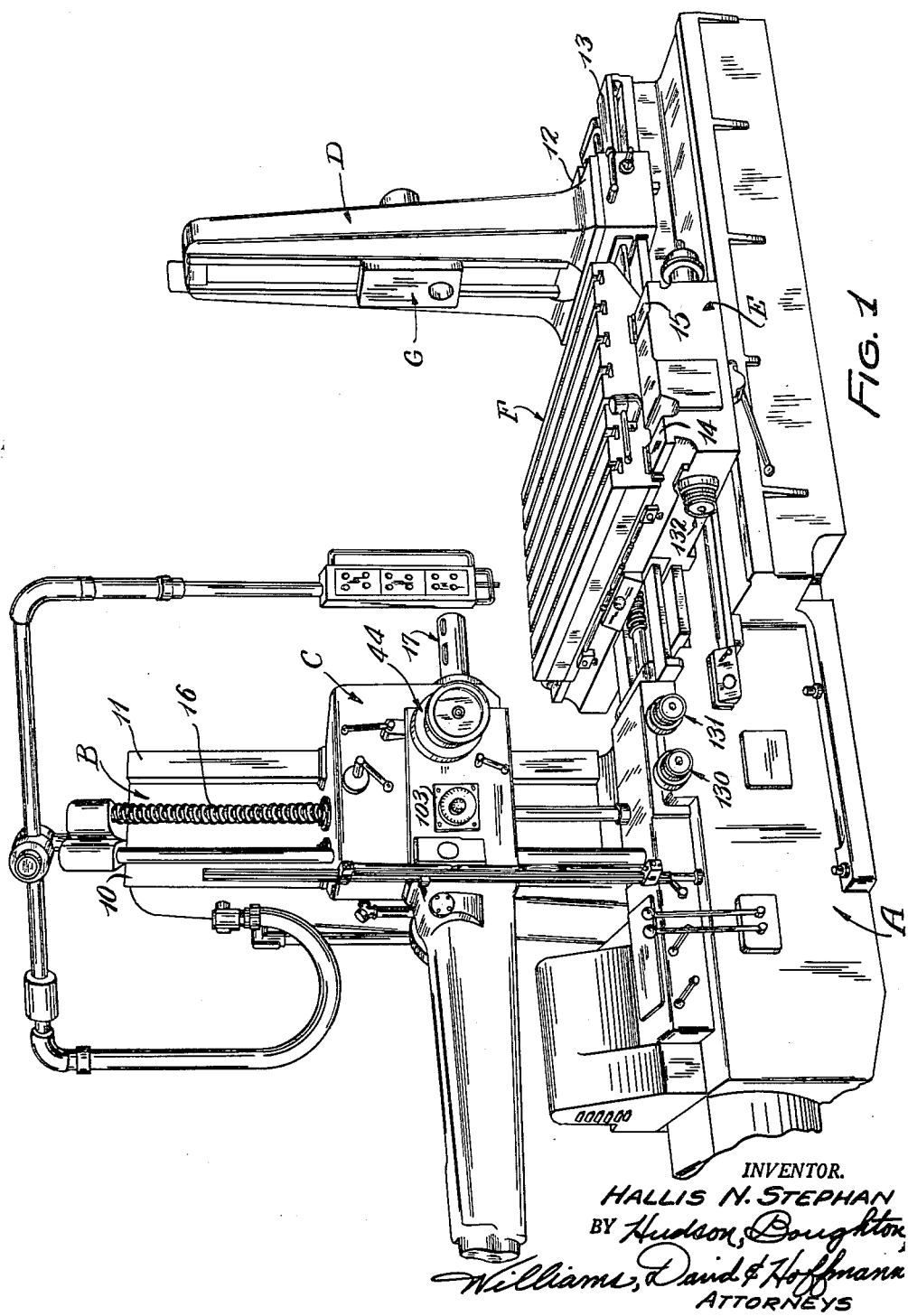

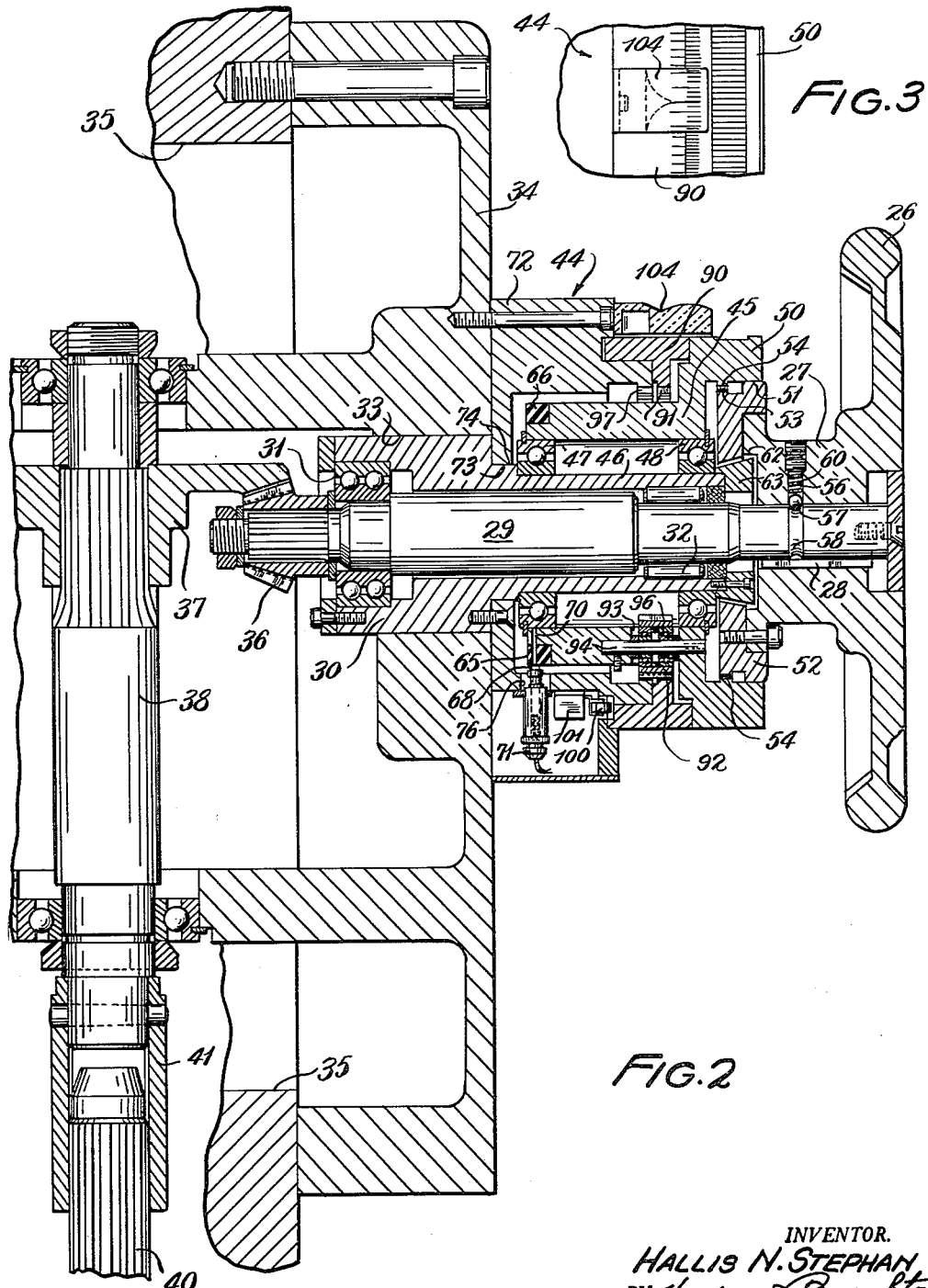

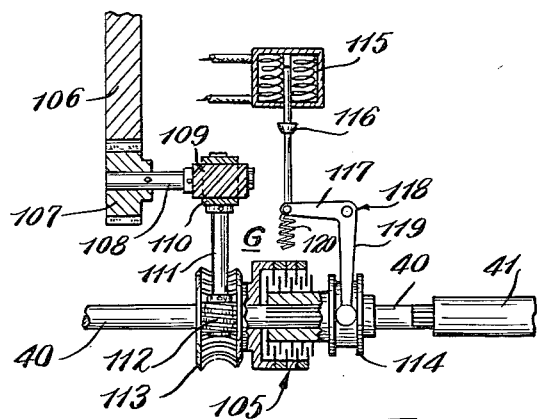
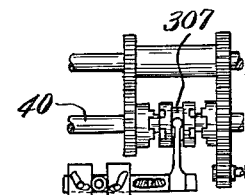
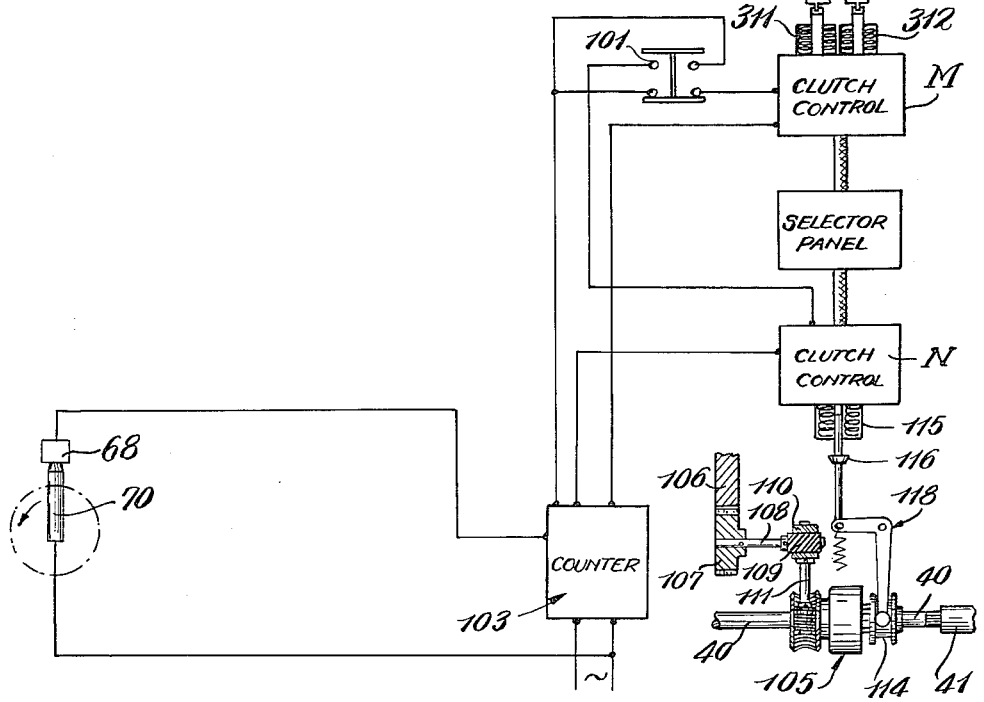
FIG. 4
FIG. 5
INVENTOR.
HALLIS N. STEPHAN

3,047,117
COMBINED HORIZONTAL BORING, DRILLING AND MILLING MACHINE
Hallis N. Stephan, Cleveland Heights, Ohio, assignor to The New Britain Machine Company, New Britain, Conn., a corporation of Connecticut
Filed Dec. 10, 1956, Ser. No. 627,465
4 Claims. (Cl. 192—139)

The present invention relates to machine tools, and, more particularly, to combined horizontal boring, drilling and milling machines having a presettable mechanism operable to accurately measure the movement of a machine tool element of the machine and to stop the element after it has moved the preselected distance.

The principal object of the present invention is the provision of a new and improved machine tool, particularly a combined horizontal boring, drilling and milling machine having a movable machine tool element, such as a saddle, table, spindle, or spindle head, and a simple compact mechanism operable to measure the movement of the element and presettable to stop the element after it has moved a preselected distance, the mechanism preferably being so constructed and arranged that an initial part of the translatory movement of the element may selectively be at a relatively rapid rate.

Another object of the present invention is the provision of a new and improved machine tool, particularly a combined horizontal boring, drilling and milling machine having a movable machine tool element, such as a spindle, spindle head, saddle, or table, and power positioning mechanism for moving the element a preselected distance from any immediate position comprising a first member moved through a closed path in timed relation to the movement of the element and carrying signal means adapted to actuate control mechanism for stopping the movement of the element when the member is in a predetermined position, and means, preferably including a second member moved through a closed path in timed relation to the movement of the element and at a slower rate of movement than the first mentioned member, for changing the rate of movement of the element after the latter has moved a preselected distance.

Another object of the present invention is the provision of a new and improved machine tool, particularly a combined horizontal boring, drilling and milling machine, having a movable machine tool element, such as a spindle, spindle head, saddle, or table, and dial mechanism operable to measure the movement of the machine tool element from any immediate position and presettable to stop the element after it has moved a preselected distance, the dial mechanism including a first or fine dial member rotated or otherwise moved in a closed path in timed relation to the movement of the element, the fine dial member carrying signal means for causing the control means to stop the movement of the element upon movement to a predetermined position, and a second or coarse presettable dial member rotated or otherwise moved through a predetermined portion of a closed path or revolution for each revolution of the fine dial member, the coarse dial member carrying actuating means for changing the rate of movement of the machine tool element.

Another object of the present invention is the provision of a new and improved machine tool, particularly a combined horizontal boring, drilling and milling machine having a movable machine tool element such as a spindle head, table, or saddle, and dial mechanism operable to measure the movement of the member from any given position and to stop the element after it has moved a preselected distance from the given position, the dial mechanism including a first dial or scale member rotated in timed relation to the movement of the element and a second dial or scale member rotated through a portion of a complete revolution for each revolution of the first dial member, the second dial member carrying switch actuating means adapted to engage switch operating mechanism for changing the rate of movement of the element and the first dial member carrying signal means effective to produce a pulse each time the dial member is in a predetermined angular position, the first dial member being angularly adjustable to initially displace the first dial member a selectable angular amount from the predetermined position, and the dial mechanism further comprising a counter presettable to perform a control operation after receiving a preselected number of pulses.

Another object of the present invention is the provision of a new and improved machine tool, particularly a combined horizontal boring, drilling and milling machine, having a machine tool element, such as a saddle, table, or spindle head, and a simple, compact mechanism operable to measure the movement of the element and presettable to stop the element after it has moved a preselected distance, the mechanism preferably including signal means carried by a member rotatable in timed relationship to the movement of the element for producing an output signal at a predetermined point in each revolution of the signal member, with the signal means being adjustable from an initial position to adjust the movement of the element prior to the first signal and including counting means for counting the signals and performing an operation after a preselected count.

Another object of the present invention is the provision of a new and improved machine tool, particularly a combined horizontal boring, drilling and milling machine, having a movable machine tool element, such as a spindle, spindle head, saddle, or table, and power-positioning mechanism for moving the element a preselected distance from its immediate position comprising a shaft rotated in timed relation to the movement of the element, a conductive member rotatable with the shaft and engageable with a cooperating conductive member to complete a circuit at a predetermined point in each revolution of the shaft and supply a pulse to a presettable counting mechanism effective to actuate a circuit to stop the element after receiving a preselected number of pulses, the conductive member being adjustable relative to the shaft to determine the movement of the element prior to the first pulse to obtain a fine setting of the mechanism.

The invention resides in certain constructions and combinations and arrangements of parts and further advantages will be apparent to those skilled in the art to which it relates from the following description of the preferred embodiment described with reference to the accompanying drawings forming a part of this specification, in which:

FIG. 1 is a perspective view of a combined horizontal boring, drilling and milling machine embodying the present invention;

FIG. 2 is a sectional view with parts in elevation of the power-positioning mechanism for the spindle of the machine of FIG. 1;

FIG. 3 is a fragmentary plan view of the power-positioning mechanism showing the dial scales of the mechanism;

FIG. 4 is a view, partly schematic, showing a portion of the spindle drive; and

FIG. 5 is a diagrammatic and block circuit diagram of the electrical circuit used with the illustrated embodiment of the present invention for controlling the positioning of the spindle.

Although the invention is susceptible of various modifications and alternative constructions, it is particularly applicable to and is herein shown and described as embodied in a combined horizontal boring, drilling and milling machine of the general character shown in U.S. Patent No. 2,350,174 issued May 30, 1944.

Referring to the drawings, the machine shown therein comprises a base A, provided at one end with a spindle head column B formed with vertical ways 10 and 11 upon which a spindle head C is mounted for vertical movement, and at the other end with a backrest or outboard support column D slidably supported on horizontal ways 12 and 13 formed on the upper side of the bed. The ways 12 and 13 also support a saddle E having transverse horizontal ways 14 and 15 on the upper side which, in turn, support a work table F. The backrest column D is provided with vertical ways upon which a backrest block G is mounted for vertical movement.

The spindle head is adapted to be moved vertically along the ways 10 and 11 by a lead screw 16 rotatably supported in the machine in a suitable manner and having threaded engagement with a nut fixed in the spindle head. In addition to being rotatable in opposite directions, the tool spindle 17 is movable in opposite directions longitudinally of its axis of rotation at different speeds to effect both feed and rapid movements. The backrest block or outboard support G is movable simultaneously with the movement of the spindle head C by a vertical lead screw 18 located within the backrest column D and connected to the drive for rotating the screw 16. The saddle E is movable longitudinally of the tool spindle along the ways 12 and 13 and the table F is movable transversely of the tool spindle along the ways 14 and 15 at different speeds. The speed and direction of rotation of the spindle, etc., and the aforesaid movements of the various machine tool elements, such as the feed and rapid movements of the spindle head, saddle, table, etc., are performed by power and their operation may be controlled from any convenient place about the machine.

In the machine illustrated, the spindle may be moved axially by means of a handwheel 26 having a hub 27 connected by a key 28 to the outer end of a shaft 29 extending outwardly of the spindle head housing and rotatably supported in a sleeve 30 by a roller bearing 31 adjacent to the inner end of the sleeve and a needle bearing 32 adjacent the outer end of the sleeve. The sleeve 30 is received in an opening 33 of a bracket 34 bolted to the face of the spindle head and covering an opening 35 in the spindle head housing through which the shaft 29 extends into the spindle head. The inner end of the shaft 29 has a bevel gear 36 splined thereto.

The gear 36 meshes with a bevel gear 37 splined to a horizontal shaft 38. The shaft 38 is a relatively short section and is rotatably supported by a bracket 34 and is removable therewith through the opening 35. The shaft 38 is connected with an aligned shaft 40 by a sleeve 41 pinned to the lower end of the shaft as the latter is viewed in FIG. 2 and splined to the adjacent end of the aligned shaft 40. The opening 35 is of such a size that when the bracket 34 is unbolted from the spindle head housing the shaft 38 may be moved axially a sufficient distance to disconnect the sleeve 41 from the shaft 40 and the shaft 38 removed from the spindle head housing with the bracket. The shaft 40 is operatively connected to the drive for feeding and rotating the spindle shown in detail in the aforesaid patent and corresponds to shaft 300 of the patent. Upon rotation of the handwheel 26 the spindle will be fed axially and when the spindle is moved axially by power, either through the operation of the spindle rapid traverse motor (not shown) or the main feed and spindle rotation motor (not shown), the shaft 40 and, in turn, the shafts 38, 29 will rotate in timed relationship to the axial movement of the spindle.

A power-positioning mechanism 44 presettable to stop the axial movement of the spindle after it has moved a preselected distance is provided and is associated with the handwheel 26 and shaft 29. The power-positioning mechanism comprises an annular dial or signal member 45 rotatably supported on a reduced outer end portion 46 of the sleeve 30 by roller bearings 47, 48 adjacent the inner and outer ends respectively of the reduced portion. The annular member 46 has a radially extending flange portion 50 adjacent its outer end, the flange portion 50 being counterbored to provide a bore 51 for receiving a ring 52 carried by the inner end of the hub 27 of the handwheel 26. The ring 52 is formed on its outer periphery adjacent its inner end with teeth 53 which are adapted to mesh with teeth 54 formed on the side wall of the bore 51. The teeth 53, 54 when meshed form a clutch for connecting the annular member 45 and the handwheel 26, and, in turn, the shaft 29 for rotation as a unit. The key 28 permits axial movement of the handwheel 26 with respect to the shaft 29 and the hub of the handwheel 27 is provided with a bore 56 in which a detent ball 57, adapted to be received in an annular groove 58 in the shaft 29, is positioned. The detent ball 57 is spring biased into engagement with the shaft 29 by a spring 60 positioned in the bore 56. When the detent ball 57 is positioned in the groove 58 the handwheel 26 is in a position where the teeth 53, 54 are in mesh and the handwheel 26 is connected to the annular member 45 to drive the latter. The handwheel 26 may be shifted outwardly of the shaft by applying an axial force thereto to disengage the teeth 53, 54, thereby permitting the annular member 45 to rotate freely on its bearings 47, 48.

The ring 52 on the handwheel 26 has a central opening 62 formed with tapered side walls which cooperate with a cone-shaped collar 63 connected to the outer end of the sleeve 30 to limit the outward movement of the handwheel 26 and to apply a frictional force which resists rotation of the handwheel 26 when the teeth 53, 54 are disengaged.

The inner end of the annular member 45 is reduced in diameter to form a recess 65 for receiving a ring or band 66 of insulation, preferably nylon. The ring 66 has a square configuration and the outer periphery thereof is engaged by a brush 68 adjacent the ring. Once during each revolution of the annular member 45 the brush 68 is engaged by a pin 70 which extends radially through the ring 66 and the annular member 45 into engagement with the outer race of the ball bearing 47. The outer end of the pin 70 is flush with the periphery of the insulating ring 66 and the pin completes an electrical connection between the brush 68 and the positive line of an electrical source once during each revolution of the annular member 45 thereby providing an electrical pulse.

The brush 68 is mounted in a brush holder 71 supported by a cup-shaped member 72 bolted to the bracket 34 and having an opening 73 in the bottom thereof through which the sleeve 30 passes. The shaft 29 and the annular member 45 are within the cup-shaped member and the sleeve 30 has an intermediate reduced portion 74 between the outer reduced portion 46 and the inner end of the sleeve which is of substantially the same diameter as the opening 73 in the bottom of the cup-shaped member 72 and which forms a shoulder that abuts the bottom of the member 72, the bottom being bolted to the shoulder formed by the reduced portion 74. The brush holder 71 is connected to the outer side wall of the cup-shaped member 72 and extends inwardly of the cup-shaped member through an opening 76.

In addition to the annular member 45, which is rotated through a complete revolution for each revolution of the shaft 29, the power-positioning mechanism comprises a dial member 90 rotatably supported by the outer end of cup-shaped member 72 and disposed intermediate the cup-shaped member and the flange portion 50 of the annular member 45. The dial member 90 is positioned coaxially about the annular member and has a central opening therethrough and is formed to provide a ring gear 91 which meshes with a pinion gear 92 carried by the annular member 45 and disposed in a recess 93 therein. The pinion gear 92 is supported by a pin 94 extending parallel to the axis of the member 45 with the gear being supported on the pin by ball bearings 96. As the annular member 45 is rotated a rotational component is imparted to the pinion gear 92 by a gear 97 formed on the internal side wall of the cup-shaped member 72 adjacent the dial member 90. The teeth of the gear 92 are of sufficient length to mesh with both the teeth 91 and the teeth 97. The gear 91 is formed with one more tooth than the gear 97 and, therefore, the dial member 90 is rotated the spacing of one tooth for each rotation of the annular member 45. It is to be understood, of course, that the gears may be formed so that the dial member 90 is rotated any desired amount for each revolution of the annular member. Preferably the dial member 90 has graduations on its periphery indicating the number of units, such as, feet traveled by the element for a given angular movement of the dial member 90. The dial member 90 is provided with a switch operating member 100 adapted to actuate a switch 101 when the dial member is at a zero angular position and is presettable by angularly displacing the dial member from its zero position so that the switch 101 is actuated, after a predetermined movement of the dial member and in turn the tool spindle, to perform a control operation.

The dial positioning mechanism 44 is preferably arranged so that it is operable to change the speed of movement axial of the tool spindle after it has moved a preselected distance toward a desired stop position and then to stop the axial movement of the spindle at the preselected position. The dial member 90 is preset to actuate the switch 101 to provide a signal to change the speed of movement of the spindle and a counter 103 is provided to count the pulses from the brush 68 and pin 70 and to stop the axial movement of the spindle when the latter is at the preselected position. The counter 103 is a type which is presettable to perform a control operation after it has received the number of pulses corresponding to the setting thereof and provides an output signal which is utilized to stop the movement of the spindle. Inasmuch as a pulse to the counter corresponding to one revolution of the signal member would normally indicate a relatively coarse unit of movement of the spindle, the positioning mechanism is so constructed that the annular member 45 may be positioned to move a preselected distance prior to the pin 70 initially engaging the brush 68 to produce a pulse. The pin 70 may be adjusted angularly by declutching the handwheel 26 from the dial member 45 and rotating the latter. In this manner a finer setting of the dial positioning mechanism for the stop position may be obtained and the pin 70 is initially displaced a distance from the brush 68 which is equal to the distance to be traveled in excess of the whole number of units, as measured by a complete rotation of the annular member 45, to be traveled. To facilitate the setting of the pin 70, the flange portion 50 of the annular member 45 is provided with graduations adjacent the inner edge thereof and a relatively fixed pointer is provided as part of a Lucite pointer member 104 secured to the cup-shaped housing 72. The pointer also is used in cooperation with the graduations on the dial member 90 to facilitate the setting thereof.

Summarizing, the dial member 90 is displaced an angular distance with respect to the zero mark on the pointer member 104, which corresponds to the distance which the spindle is to travel before the speed thereof is to be changed. After the spindle has moved the preselected distance the dial member 90 will have been returned to its zero position and the switch 101 will be actuated to provide a signal for changing the speed of movement of the spindle. The stop position of the spindle is selected by setting the counter to a number corresponding to the number of whole units, each whole unit being the distance the spindle moves for each revolution of the annular member 45, which the spindle is to travel before stopping, and by angularly displacing the member 45 from its zero angular position with the pin in engagement with the brush 68, to displace the pin 70 from the brush 68 an amount equal to the distance to be traveled greater than the whole number of units. For example, if the spindle moves 1/8" for every revolution of the annular member 45 and the distance to be moved is 0.3000", the counter would be set to perform a control operation after receiving 3 pulses and the pin 70 would be angularly displaced by declutching the handwheel 26 from the member 45 and rotating the member 45 an amount equal to .050" of movement of the spindle as indicated by the graduations on the periphery of the flange portion 50 and the handwheel 26 again clutched to the member 45 to provide a drive from the shaft 29. It will be noted that the counter for the illustrated machine is of the type which performs a control operation after receiving N plus 1 pulses, N being the number preset in the counter. One suitable type counter which may be used is an "HZ" series microflex reset counter manufactured by the Eagle Signal Company of Moline, Illinois and is illustrated in their Bulletin 720 issued May 1950. The particular counter shown has unit and sub-unit dials for setting the counter. It will be understood that other counters may be utilized.

The drive for the spindle of the machine shown is substantially the same as that shown in the aforesaid patent, with the differences to be pointed out hereinafter. The spindle 17 is moved at a fast rate in one direction or the other by energizing one or the other of the solenoids 311, 312 to shift a clutch element 307 to an engaged position. The clutch element 307 and the solenoids 311, 312 are shown schematically in FIG. 5 and indicated by the same reference numerals as in the aforesaid patent.

Actuation of the switch 101 causes deenergization of whichever of the solenoids 311, 312 is energized at the time to disengage the clutch element 307 of the connecting spindle drive mechanism for moving the spindle at a fast rate and energizes a solenoid 115 to engage the spindle drive mechanism for moving the spindle at a slow rate. The spindle drive mechanism for moving the spindle at a slow rate is in addition to the usual drive through the clutch 307, and includes an additional drive G to the shaft 40 which corresponds to the shaft 300 of the aforesaid patent. The drive G is from a gear 106 fixed to the spindle quill through a clutch 105 to the shaft 40. The gear 106 corresponds to the gear 259 of the aforesaid patent. The drive G includes a gear 107 in mesh with the gear 106 and fixed to one end of a shaft 108 having a worm gear 109 at its other end which meshes with a worm gear 110 fixed to one end of a shaft 111 having a worm 112 at its other end which meshes with a worm wheel 113 rotatably supported on the shaft 40. The worm wheel 113 is formed as a part of the driving element of the clutch 105 and, when the clutch is actuated to an engaged position by the shifting of a cone member 114, imparts a rotation to the shaft 40. The cone member 114 is splined to the shaft 40 and carries the driven clutch member and is shifted to its engaged position by the energization of the solenoid 115 having a core 116 connected to an arm 117 of a bell crank lever 118. The bell crank lever 118 has a second arm 119 connected to the clutch cone 114 to shift the latter when the solenoid is energized. The bell crank lever 118 is normally biased to a clutch disengaged position by a spring 120 connected to the arm 117.

The switch 101 has contacts included in a control circuit M for clutch element 307 and in a control circuit N for the clutch 105. When the switch 101 is actuated while the spindle is being moved at either feed or rapid traverse rates or speeds through the clutch element 307, by the conventional means provided, the clutch element 307 is moved to its neutral position to stop the feed or rapid traverse motion of the spindle and the clutch 105 is actuated to its engaged position to provide a fine or positioning feed. The clutch 105 is returned to its disengaged position in response to an output signal from the counter 103 to stop the element at the preselected position.

While the power-positioning mechanism has been described as controlling clutches which, in turn, control the rate of movement of the spindle, it will be understood that the signals from the dial members of the power-positioning mechanism may be used in other ways to control the operation of the spindle. For example, the signals could be utilized to change the speed of and stop a driving motor which is operable to move the spindle.

Power-positioning mechanisms may also be utilized to position the spindle head, the saddle, and the table of the machine shown in the drawings and such mechanisms, which are of a structure similar to that described for positioning the spindle, are shown on the machine for positioning the spindle head, saddle, and table and are respectively designated by the reference numerals 130, 131 and 132. The mechanisms 130, 131 and 132 are shown associated with the shafts for receiving hand cranks to move the spindle head, saddle, and table.

While the shaft 29 has been illustrated and described as being driven from the gear train for moving the spindle axially, it will be understood that other suitable mechanism or device, such as a cable connected directly to the spindle, may be provided for rotating the shaft 29 in timed relationship to the axial movement of the spindle.

It can now be seen that the present invention provides a new and improved machine tool having power-positioning mechanism for positioning an element thereof, which mechanism is compact and simple in operation and is operable to stop the element at the preselected position and preferably to change the speed of movement of the element when approaching the preselected stop position.

While the preferred form of the invention has been described in considerable detail, it will be apparent that the invention is not limited to the construction shown or the uses referred to and it is hereby my intention to cover all adaptations, modifications, and changes which come within the practice of those skilled in the art to which the invention relates and the scope of the appended claims.

Having thus described my invention, I claim:

1. In a positioning system, a movable element, first drive means for moving said element at a fast speed, second drive means for moving said element at a slow speed, first control means actuatable to change the speed at which said element is moved from the fast speed to the slow speed, second control means actuatable to stop said element, a rotatable member, means connecting said rotatable member to said element to rotate in timed relation to the movement of said element, a first dial member, a support member supporting said first dial member for rotation relative to said support member and to said rotatable member, a zero reference line on said support member indicating the angular displacement of said first dial member from a predetermined angular position, means for selectively connecting the rotatable member to said first dial member for rotation therewith, signal means on said first dial member, means supported by said support member adjacent said first dial member and responsive to said signal means to provide a first control signal each time said dial member is in its said predetermined angular position, a second dial member rotatably supported by said support member, third drive means connected to said second dial member and rotating said second dial member in timed relation to the rotation of said first dial member and through a predetermined portion of one revolution for each complete revolution of said first dial member and including means for selectively disconnecting said drive means from said second dial member, signal means on said second dial member, means on said support member responsive to said signal means on said second dial member and providing a second control signal when the second dial member is moved to a predetermined angular position, means responsive to said second control signal to actuate said first control means to change the speed of said element, and means responsive to said first control signal to actuate said second control means to stop said element when said dial members have been driven to their said predetermined positions.

2. In a positioning system a movable element, first drive means for moving said element at a fast speed, a second drive means for moving said element at a slow speed, first control means actuatable to change the speed at which said element is moved from the fast speed to the slow speed, second control means actuatable to stop said element, a rotatable member, means connecting said rotatable member to said element to rotate in timed relation to the movement of said element, a first dial member, a support member supporting said first dial member for rotation relative to said support member and to said rotatable member, a zero reference line on said support member indicating the angular displacement of said first dial member from a predetermined angular position, means for selectively connecting said rotatable member to said first dial member for rotation therewith, an electric circuit, a conductive pin mounted on said first dial member and in said circuit, a brush in said circuit and supported by said support member adjacent said first dial member to engage the pin as said first dial member rotates to periodically complete said circuit and provide a control signal for each rotation of said first dial, a second dial member rotatably supported by said support member, third drive means connected to said second dial member and rotating said second dial member in timed relation to the rotation of said first dial member and through a predetermined portion of one revolution for each complete revolution of said first dial member and including means for selectively disconnecting said second drive means from said second dial member, signal means on said second dial member, means on said support member responsive to said signal means on said second dial member and providing a second control signal when the second dial member is moved to a predetermined angular position, means responsive to said second control signal to actuate said first control means to change the speed of said element, and means responsive to said first control signal to actuate said second control means to stop said element when said dial members have been driven to their predetermined positions.

3. A positioning system, a movable element, first drive means for moving said element at a fast speed, second drive means for moving said element at a slow speed, first control means actuatable to change the speed at which said element is moved from the fast speed to the slow speed, second control means actuatable to stop said element, a rotatable member, means connecting said rotatable member to said element to rotate in timed relation to the movement of said element, a first dial member, a support member supporting said first dial member for rotation relative to said support member and to said rotatable member, a zero reference line on said support member indicating the angular displacement of said first dial member from a predetermined angular position, means for selectively connecting said rotatable member to said first dial member for rotation therewith, signal means on said first dial member, means supported by said support member adjacent said first dial member and responsive to said signal means to provide a first control signal each time said dial member is in its predetermined angular position, a second dial member rotatably supported by said support member, third drive means connected to said second dial member and rotating said second dial member in timed relation to the rotation of said first dial member and through a predetermined portion of one revolution for each complete revolution of said first dial member, and including means for selectively disconnecting said second drive means from said second dial member, signal means on said second dial member, means on said support member responsive to said signal means on said second dial member and providing a second control signal when said second dial member is moved to a predetermined angular position, means responsive to said second control signal to actuate said first control means to change the speed of said element, and an adjustable counter for counting the first control signals and actuating said second control means after receiving a predetermined number of said first control signals.

4. In a positioning system a movable element, first drive means for moving said element at a fast speed, second drive means for moving said element at a slow speed, first control means actuatable to change the speed at which said element is driven from the fast speed to the slow speed, second control means actuatable to stop said element, a rotatable member, means connecting said rotatable member to said element to rotate in timed relation to the movement of said element, a first dial member, a support member supporting said first dial member for rotation relative to said support member and to said rotatable member, a zero reference line on said support member indicating the angular displacement of said first dial member from a predetermined angular position, means for selectively connecting said rotatable member to said first dial member for rotation therewith, an electric circuit, a conductive pin mounted on said first dial member and in said circuit, a brush in said circuit supported by said support member adjacent said first dial member to engage said pin as said first dial member rotates to periodically complete said circuit and provide a first control signal for each rotation of said first dial member, a second dial member rotatably supported by said support member, third drive means connected to said second dial member and rotating said second dial member in timed relation to the rotation of said first dial member and through a predetermined portion of one revolution for each complete revolution of said first dial member and including means for selectively disconnecting said second drive means from said second dial member, signal means on said second dial member, means on said support member responsive to said signal means on said second dial member and providing a second control signal when the second dial member is moved to a predetermined angular position, means responsive to said second control signal to actuate said first control means to change the speed of said element and an adjustable counter means for counting said first control signals and actuating said second control means after receiving a predetermined number of said first control signals.

References Cited in the file of this patent

UNITED STATES PATENTS

| | | |
|---|---|---|
| 1,760,938 | Edgar | June 3, 1930 |
| 2,012,249 | Sassen | Aug. 30, 1935 |
| 2,467,422 | Bruene | Apr. 19, 1949 |
| 2,672,067 | Hansell | Mar. 16, 1954 |
| 2,710,934 | Senn | June 14, 1955 |
| 2,728,248 | De Vlieg | Dec. 27, 1955 |
| 2,853,900 | Hellyer | Sept. 30, 1958 |